United States Patent
Goodman

(10) Patent No.: US 8,566,598 B2
(45) Date of Patent: Oct. 22, 2013

(54) METHOD FOR ARTICLE AUTHENTICATION USING AN ARTICLE'S AUTHENTICATION CODE AND A SECOND CODE PROVIDED BY THE PARTY REQUESTING AUTHENTICATION

(75) Inventor: Thomas C. Goodman, Tucson, AZ (US)

(73) Assignee: Goodman Consulting Group, Tucson, AZ (US)

( * ) Notice: Subject to any disclaimer, the term of this patent is extended or adjusted under 35 U.S.C. 154(b) by 1207 days.

(21) Appl. No.: 11/219,343

(22) Filed: Sep. 2, 2005

(65) Prior Publication Data

US 2007/0056041 A1 Mar. 8, 2007

(51) Int. Cl.
 G06F 7/04 (2006.01)
 G06F 17/30 (2006.01)
 H04N 7/16 (2011.01)
 H04L 9/32 (2006.01)

(52) U.S. Cl.
 USPC ............................................ 713/179; 726/26

(58) Field of Classification Search
 USPC ........ 713/179, 182; 726/26, 30; 340/5.8, 5.86
 See application file for complete search history.

(56) References Cited

U.S. PATENT DOCUMENTS

| | | | |
|---|---|---|---|
| 4,165,002 A | 8/1979 | Meagher | |
| 5,753,511 A | 5/1998 | Selinfreund | |
| 5,768,384 A * | 6/1998 | Berson | 705/50 |
| 6,456,729 B1 * | 9/2002 | Moore | 382/103 |
| 6,490,030 B1 | 12/2002 | Gill et al. | |
| 6,512,580 B1 | 1/2003 | Behringer et al. | |
| 6,536,672 B1 | 3/2003 | Outwater | |
| 6,547,137 B1 * | 4/2003 | Begelfer et al. | 235/385 |
| 6,556,139 B2 | 4/2003 | Manov et al. | |
| 6,886,748 B1 * | 5/2005 | Moore | 235/435 |
| 2002/0178363 A1 * | 11/2002 | Ambrogio et al. | 713/176 |
| 2003/0179902 A1 * | 9/2003 | Ambrogio et al. | 382/100 |
| 2004/0201873 A1 * | 10/2004 | Erickson et al. | 359/15 |
| 2004/0205343 A1 * | 10/2004 | Forth et al. | 713/168 |
| 2005/0178841 A1 * | 8/2005 | Jones et al. | 235/468 |
| 2006/0010503 A1 | 1/2006 | Inoue et al. | |
| 2009/0009285 A1 * | 1/2009 | Corry et al. | 340/5.86 |

FOREIGN PATENT DOCUMENTS

| | | |
|---|---|---|
| JP | 2004-252621 | 9/2004 |
| JP | 2004-348443 | 12/2004 |

OTHER PUBLICATIONS

International Search Report for International Application No. PCT/US2006/034676 (2007).

* cited by examiner

*Primary Examiner* — Philip Chea
*Assistant Examiner* — Trong Nguyen
(74) *Attorney, Agent, or Firm* — Viksnins Harris & Padys PLLP

(57) ABSTRACT

Counterfeit articles are distinguished from genuine articles by a combination of a party-specific code and a product authentication code of the article. After authenticating a genuine article, a replacement authentication code is generated based on the original authentication code and party-specific code. Documents and currencies can be authenticated independently of any party-specific code by an addition to or alteration of their authentication code with each authentication event.

3 Claims, 4 Drawing Sheets

FIG. 2 -- Addendum to Schema 1 Permitting the Transfer of an Authenticatable Product Between Different Parties FIG. 3 -- Method of Document or Currency Authentication

METHOD FOR ARTICLE AUTHENTICATION USING AN ARTICLE'S AUTHENTICATION CODE AND A SECOND CODE PROVIDED BY THE PARTY REQUESTING AUTHENTICATION

TECHNICAL FIELD

This document pertains to authentication in general and, in particular, to authentication of products, documents, and currencies.

BACKGROUND

Counterfeit products and documents can erode consumer confidence, generate losses for manufacturers and distributors, and destabilize organizations and governments that depend on secure documents and currencies.

Known methods for establishing the authenticity of a product or document are frequently able to be circumvented and can be costly or inconvenient and therefore are inadequate to stem the proliferation of counterfeit products and documents.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
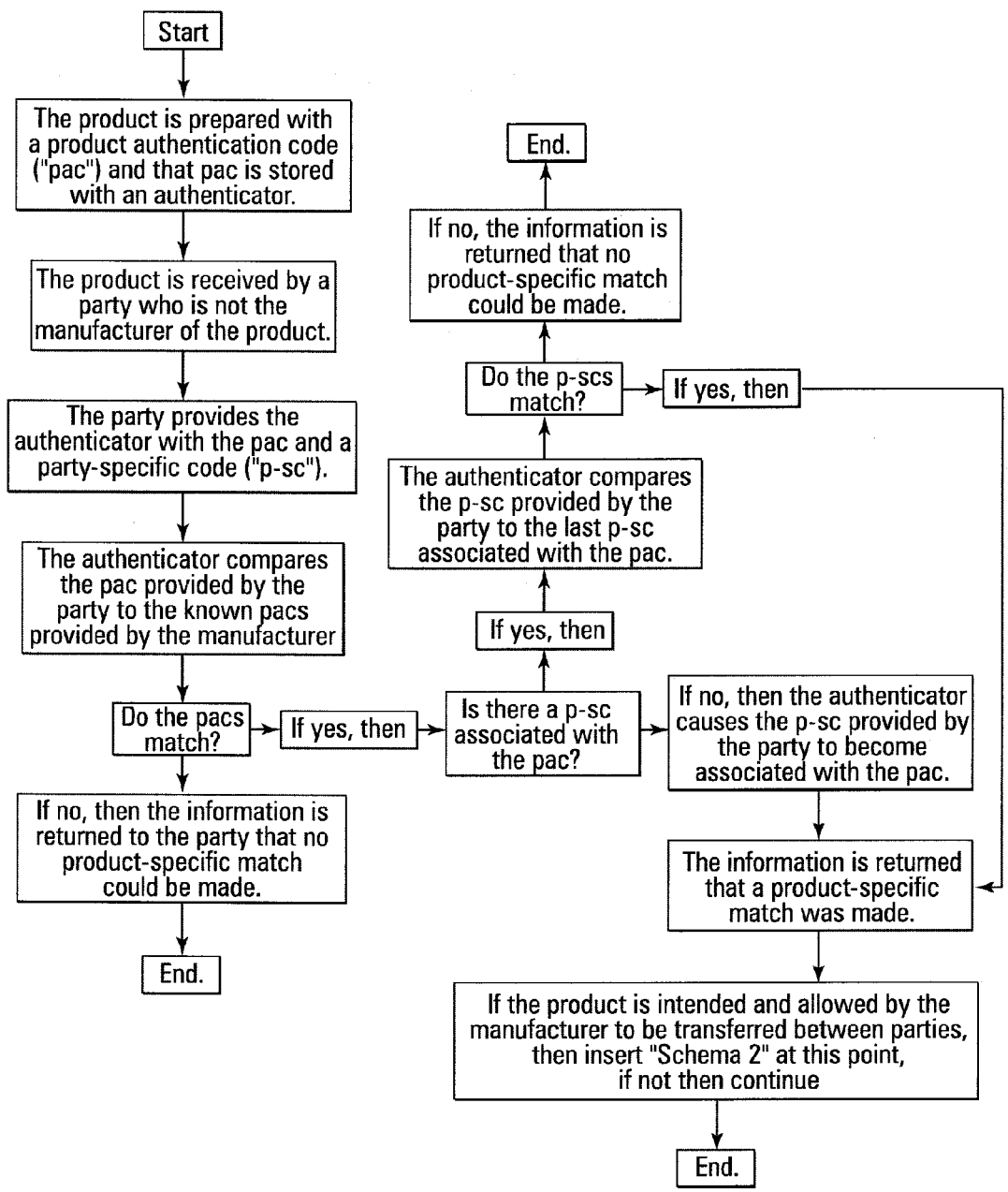
FIG. 1 includes a flow chart of a first method executed by the present subject matter.

The present subject matter includes a method for producing an authenticatable product whereby a person or party who is not the manufacturer of the product may determine that it is highly probable that the product, marked with a particular code, is an authentic product. The particular code is referred to herein as an authentication code. The present subject matter includes systems and methods for reading and writing authentication codes in order to discern genuine articles from counterfeit articles. The present subject matter can be used with tangible products and goods including manufactured items, naturally occurring materials and with documents including, for example, identification documents and currency.

In one example, the present subject matter includes a method for producing a product in a manner that allows a person or party who is not the manufacturer to determine whether a code derived from the product is contained within a list of authentication codes used by the manufacturer and thus determine authenticity of the product. The code derived from the product can be a character sequence or other code marked on the product or stored in a memory of the product or in packaging for the product. In various examples, the product is marked with the code at the time of manufacturing or at a time after manufacturing.

In one example, the product is marked with a second authentication code after having established that the first authentication code corresponds to a genuine article. The second authentication code can be marked in a different location on the article or can include a combination of the original marking and additional markings. In one example, the second authentication code is a function of the most recently added authentication code and all previous authentication codes.

In one example, a second authentication code is generated based on a first authentication code associated with the product and a party-specific code provided by a party requesting authentication. A subsequent attempt to authenticate the article requires that the requestor provide the second authentication code and the party-specific code. In various embodiments, the party-specific code can be changed upon authorization by the party that provided it, the authenticating authority, or both the current registered party and the authenticating authority.

DETAILED DESCRIPTION

Definitions

For the sake of clarity and ready reference, the following definitions will be used in describing the present subject matter.

"Product" means anything that is produced or made. For the sake of example, and not as a limitation to the scope of this term as used herein, a product may be an article of commerce, a pharmaceutical product, a medical device, a computer product, a replacement or spare part, a work of art, an item of jewelry or personal apparel, or an item of home furnishing. A product may also be a document or currency.

"Party" is the originator or maker of a request to determine the probable authenticity of a product. For the sake of example, and not as a limitation to the scope of this term as used herein, a party may be a person, a group, an organization, a business, a corporation, or a decision making machine set into operation by any of the foregoing.

The words "producer" and "manufacturer" are used interchangeably herein. Either word means the source or maker of a product who has caused an authentication code to be associated with that product and provided a listing of at least that authentication code to an authenticating authority. When a distributor or reseller or other person marks a product with a product authentication code, they become a producer or manufacturer for the purposes of this subject matter.

"Authentication code" means a series of printable characters or symbols, including spaces between those characters or symbols, or magnetically or optically encoded information that is specified by a manufacturer.

"Product authentication code" means an authentication code that has been marked upon a product, applied to a product or otherwise associated with a product by a manufacturer. "Product authentication code" may sometimes be abbreviated herein as "pac." A party-specific code may sometimes be abbreviated herein as "p-sc."

"Document or currency authentication code" means an authentication code that is applied to a document or currency, respectively, and that can be modified by an authenticator. "Document or currency" may sometimes be abbreviated herein as "doc."

"Authenticator" is a person or machine that: i.) is itself an authenticating authority, or ii.) submits the product authentication code and request for authentication to an authenticating authority and communicates the authenticating authority's response. In the case of a document or currency authentication, the authenticator may also be the agent that adds an additional authenticating mark and communicates the nature and position of such mark to the authenticating authority.

"Authenticating authority" is a person or machine that carries out the methods of product authentication or document or currency authentication as described herein. Specifically, in the case of product authentication, the authenticating authority is a person or machine that compares a product authentication code received from an authenticator or party with authentication codes received from a manufacturer, and i.) in the event of a match where there is no party-specific code associated with the product authentication code, causes the party specific code provided to it with the request for authentication to become associated with the product authentication code and communicates that the product is authentic, or ii.) in the event of a match where there is already a party-specific code associated with the product authentication code, further compares the party-specific code provided by the party requesting authentication with the party-specific code already associated with the product authentication code, and if there is a party-specific match, communicates that the product is authentic, optionally allowing for product transfer by the acceptance of a new party-specific code or iii.) if there is no match, communicates that no determination of authenticity could be made. Specifically also, in the case of a document or currency, the authenticating authority is a person or machine that compares the document or currency authentication code received from an authenticator or party with the authentication codes received from the maker of the document or currency, and i.) in the event of a match, communicates the determination of the authenticity of the document or currency and modifies its existing authentication code with the new code placed upon the document or currency by the authenticator, or ii.) in the event that no match occurs, communicates that no determination of authenticity could be made.

"Authenticatable product" is any item produced by a manufacturer and subsequently purchased, used, held or distributed by one other than the manufacturer who then has the ability to establish, with high probability, the authenticity of such product.

A "blinded comparison" is a comparison of a product authentication code with a listing of authentication codes provided by the manufacturer in such a manner that the party making or requesting the comparison cannot see the listing.

"Authentic" means that a product designated as such by the methods herein has a high probability of having been produced by the manufacturer ascribed to that product. In the case of a currency or document it means that such currency or document is regarded as authentic by the authenticating authority.

Method for Product Authentication

FIG. 1 illustrates an exemplary method of product authentication. A product is produced or prepared with a product authentication code. In various examples, the product authentication code is stored in a memory associated with the product or marked on the product or packaging. The product authentication code is also stored with an authenticating authority. When a party who is not the manufacturer of the product receives the product, the party can determine the probable authenticity of the product by providing the authenticating authority with the product authentication code and a party-specific code. This party-specific code may or may not identify the party. The data is conveyed to the authenticating authority by wireless or wired communication channel, including for example, an Internet channel, a local area network, a cellular communication network, a telephony network, a radio frequency channel or other means.

Upon receipt data, the authenticating authority compares the product authentication code with codes previously received from the manufacturer. If the code provided by the authenticator does not match a stored product authentication code, then the information is returned to the party that no match was made and the product cannot be authenticated.

If the code provided by the authenticator matches a stored code, then the authenticating authority determines whether there is already a party-specific code associated with that particular product authentication code. If there is no party-specific code associated with that particular product authentication code, then the authenticating authority causes the party-specific code (received from the party) to become associated with the particular product authentication code, and then returns the information that a match was made and that the product is authentic.

If there is a party-specific code already associated with that product authentication code, then the authenticating authority compares the party-specific code provided by the party with the party-specific code already associated with the product authentication code. If the two codes match, then the information is returned that a match was made and the product is authentic. If the product is not intended and allowed by the manufacture to be transferred between parties, then the authentication process, as described in FIG. 1, ends.

Figure 2:
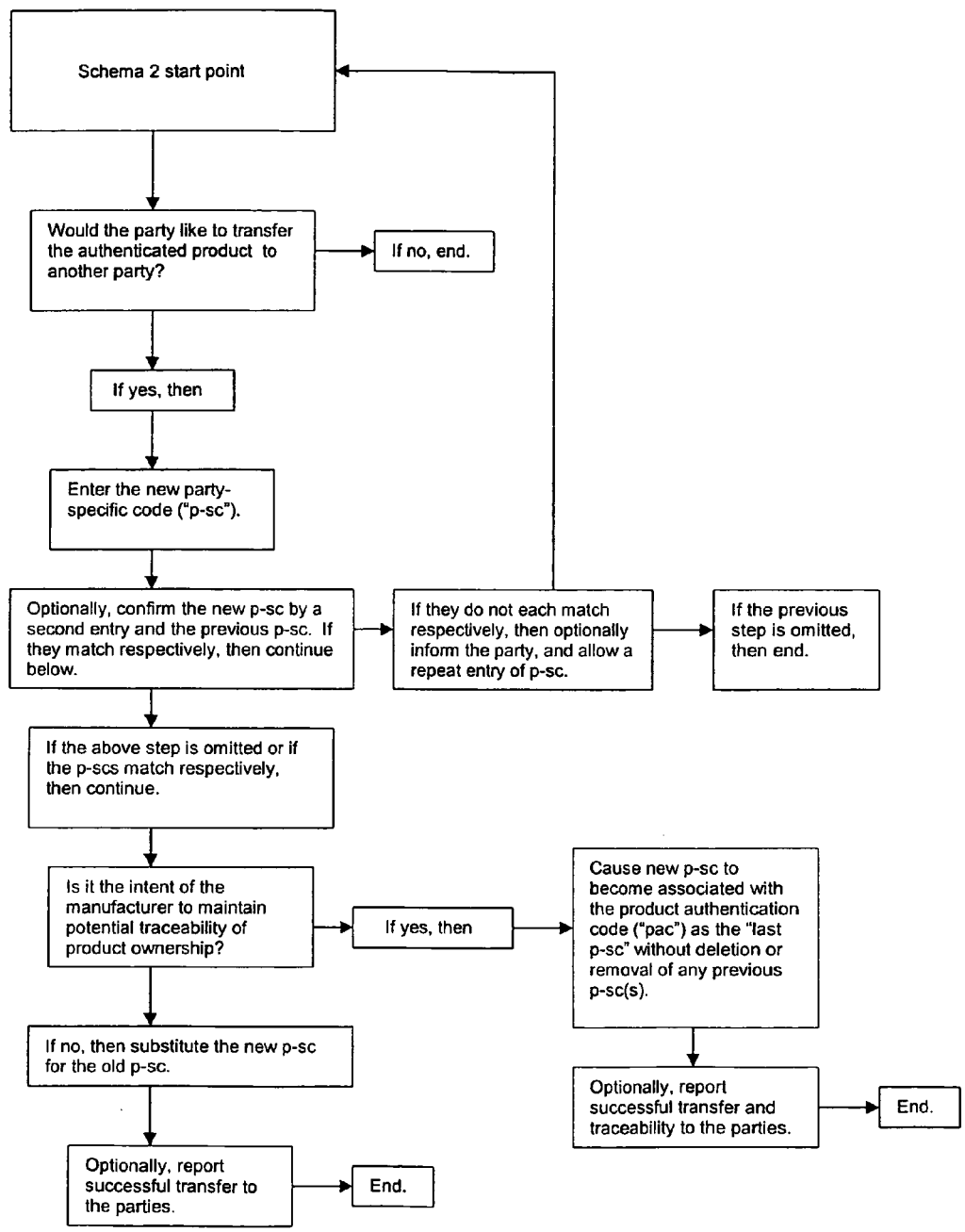
FIG. 2 includes a flow chart of a second method executed by the present subject matter.

In one example, if the product is intended and allowed by the manufacturer to be transferred between parties, then processing continues as illustrated in FIG. 2.

FIG. 2 illustrates a continuation of the method of FIG. 1 in which the manufacturer permits transfer of an authenticatable product between different parties.

The authenticating authority prompts for a selection as to whether the party would like to transfer the authenticated product to another party. If the product is not being transferred, then the authentication process ends. If the authenticated product is being transferred to another party, then the authenticating authority requests the party-specific code for the new party.

In one example, the authenticating authority validates the party-specific code of the new party by asking that it be re-entered and then confirming the instruction of the original party to engage in the transfer by having the original party re-enter their party-specific code. In one example, the authenticating authority has, at this point, a product authentication code and a party-specific code associated with that product authentication code as well as a new party-specific code.

If it is the intention of the manufacturer to trace possession of the product, then the authenticating authority can cause the new party-specific code to become associated with the product authentication code without the removal, alteration or obliteration of the previous party-specific code. In one example, in future authentications and transfers, only the most recent party-specific code will be considered by the authenticator, however, there will exist the potential to access earlier party-specific codes, known to have been associated with the product authentication code. In one example, if no traceability is contemplated, then the authenticating authority replaces the original party-specific code associated with the product authentication code with the new party's party-specific code.

In one example, at this point, the authenticating authority may report a successful transfer to the parties.

Method for Document or Currency Authentication

Figure 3:
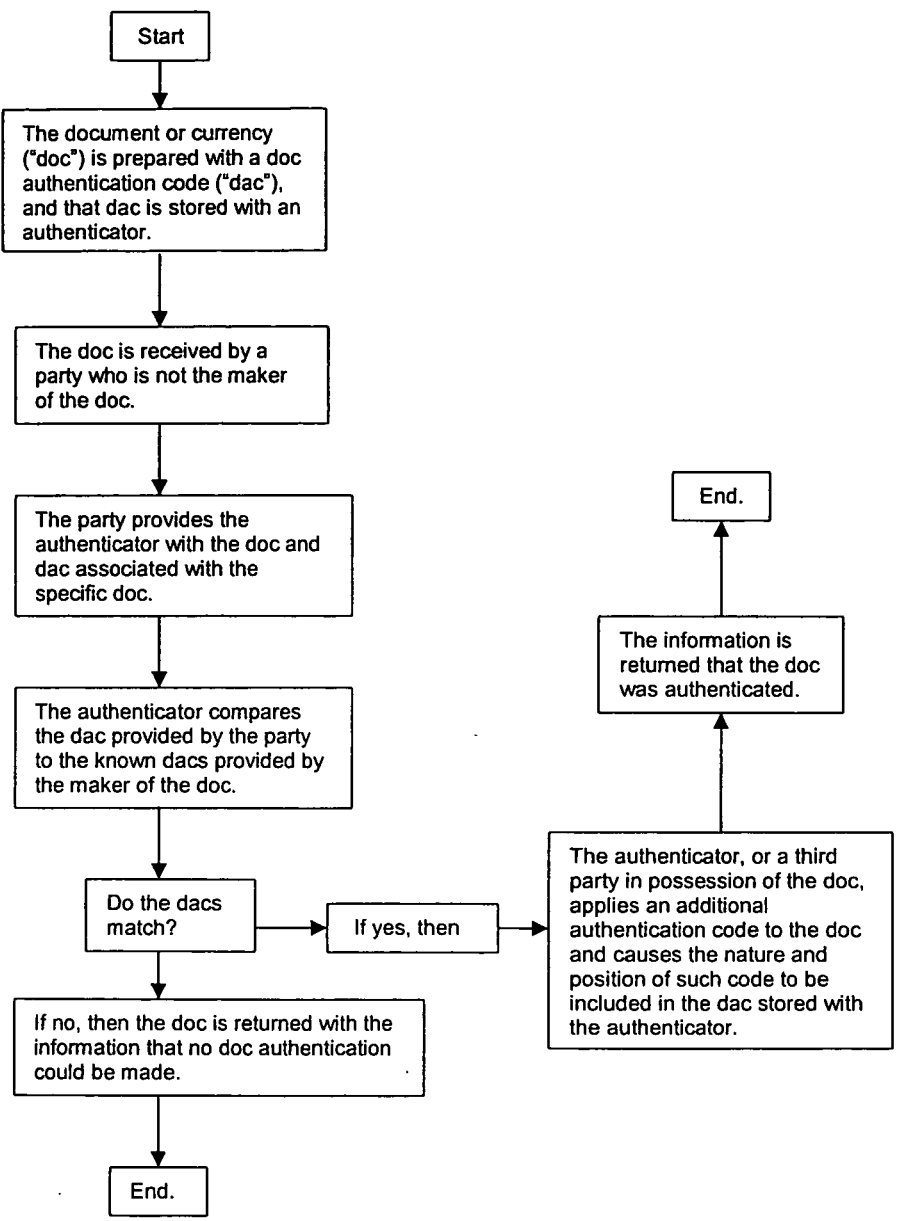
FIG. 3 includes a flow chart of a third method executed by the present subject matter.

The operation of the present method for document or currency authentication is illustrated in FIG. 3. A document or currency is prepared with an authentication code. The authentication code is stored with an authenticating authority. When a party who is not the maker of the document or currency receives the document or currency, that party can determine the authenticity of the document or currency by providing the authenticating authority with the document or currency and the associated document authentication code.

Upon receipt of a document or currency and the associated authentication code, the authenticating authority compares the authentication code received with the authentication codes stored. The stored authentication codes include verified information provided by the manufacturer. If the document or currency authentication code associated with the document or currency matches one of the stored authentication codes, then the authenticating authority or a third party in possession of the document or currency applies an additional authentication code or otherwise modifies the existing authentication code of the document or currency and causes the nature and position of such code to become included in the document or currency authentication code stored with the authenticating authority. The information is then returned that the document or currency was authenticated.

Product Authentication Codes

The present subject matter is distinguishable from serial numbers, lot numbers and product numbers. Pursuant to the present subject matter, a list of valid product authentication codes is maintained by an authenticating authority using, for example, a database. In addition, the authenticating authority provides access to the database for blinded comparisons so as to provide product authentication services. The authenticating authority receives and maintains party-specific codes associated with particular product authentication codes. The authenticating authority further communicates back to the authenticator or party requesting authentication whether such authentication occurred. In particular, the authenticating authority maintains data as to the validity of a product authentication code and historical data as to correlating the product authentication code with a party-specific code. Such records may optionally include dates and places of authentication requests. In one example, the authenticating authority conducts authentication services by a communication network. In one example, the communication network includes the Internet.

An authenticated product does not necessarily imply that the product is covered by a warranty, guarantee or carry a representation that the product is what it claims to be. For example, an authenticated pharmaceutical product could be incorrectly prepared, poorly manufactured or mislabeled by the manufacturer. Additionally, an authenticated pharmaceutical product may have been tampered with prior to the user's inquiry as to its authenticity.

In one embodiment of the present subject matter, the authentication code provides some description of the item being authenticated. For example, an authentication code can be constructed so as to contain a product name and/or model number. In authenticating such a product, the name, characteristics, and/or model number of the item could be repeated back by the authenticator to the party requesting authentication. The process of authentication may also be used to facilitate communication between the manufacturer of a product and the end user. During an authentication process, for example, a manufacturer may arrange that the authenticator offer inducements or information to the party to visit the manufacturer's website, for example, or return a product registration card, or the like.

A product authentication code can be applied to, or associated with, a product in a number of different ways. In the case of a tangible item or the packaging that encloses it, the authentication code can be printed, stamped, etched or otherwise applied to a surface, such as on a metal, plastic or paper housing or onto the item itself. In various examples, the product authentication code is marked in a conspicuous manner or in an inconspicuous manner. In the case of pharmaceuticals or medical devices, the product authentication code can be printed on a storage bottle or a sterile wrapping or placed underneath a seal that is broken when the product is used. In one example, the code is partially hidden under a tear-off or scratch-off covering. In the case of the work of art or item for personal use (such as an article of jewelry or wristwatch), the product authentication code can be placed on a back surface. In the case of an article for consumption such as a bottle of wine, the product authentication code can be marked on a bottle, a paper wrapper, or on a surface of a cork or other closure.

In various examples, the product authentication code can be printed, etched, molded, embossed or otherwise displayed visibly on the product. In various examples, the product authentication code can be encoded in an inconspicuous manner such as stored in a digital memory or encoded in a manner that is not otherwise visible to the unaided human eye. In one example, the product authentication code is machine readable using such devices as a bar code scanner, an ultraviolet light source, a magnetic storage media reader, an optical reader or an x-ray image.

In one embodiment of the present subject matter, a match between codes occurs when an authenticating authority determines there is a functional or literal identity between the code provided by a party and a code it possesses. A functionally identical code may be a literally identical code into which has been introduced irrelevant characters such as spaces, dashes, parentheses, brackets and the like that may be used to delimit portions of the code or simplify its accurate entry. Those applying authentication codes may also define and introduce irrelevant characters, specific to their own authentication codes by communicating to the authenticating authority that within an authentication code there are one or more characters that should be ignored or one or more positions at which any character provided provides an identity at that position.

In one embodiment of the present subject matter, a code may be a series of printable characters or symbols including spaces between those characters or symbols. In one embodiment of the present subject matter, a code may be magnetically or optically encoded information.

In one embodiment of the present subject matter, the party-specific code can be provided by an authenticator that it not itself the authenticating authority.

In one embodiment of the present subject matter, authentication codes may be nested. Thus, a product with an authentication code may be contained in a package having a separate and different authentication code that itself may be contained in yet another package having a separate and different authentication code. Such nesting of product authentication codes may be repeated so that those who transport, distribute, store, or otherwise handle items as intermediaries between an original producer and a final user may individually have the use of the present methods.

Figure 4:
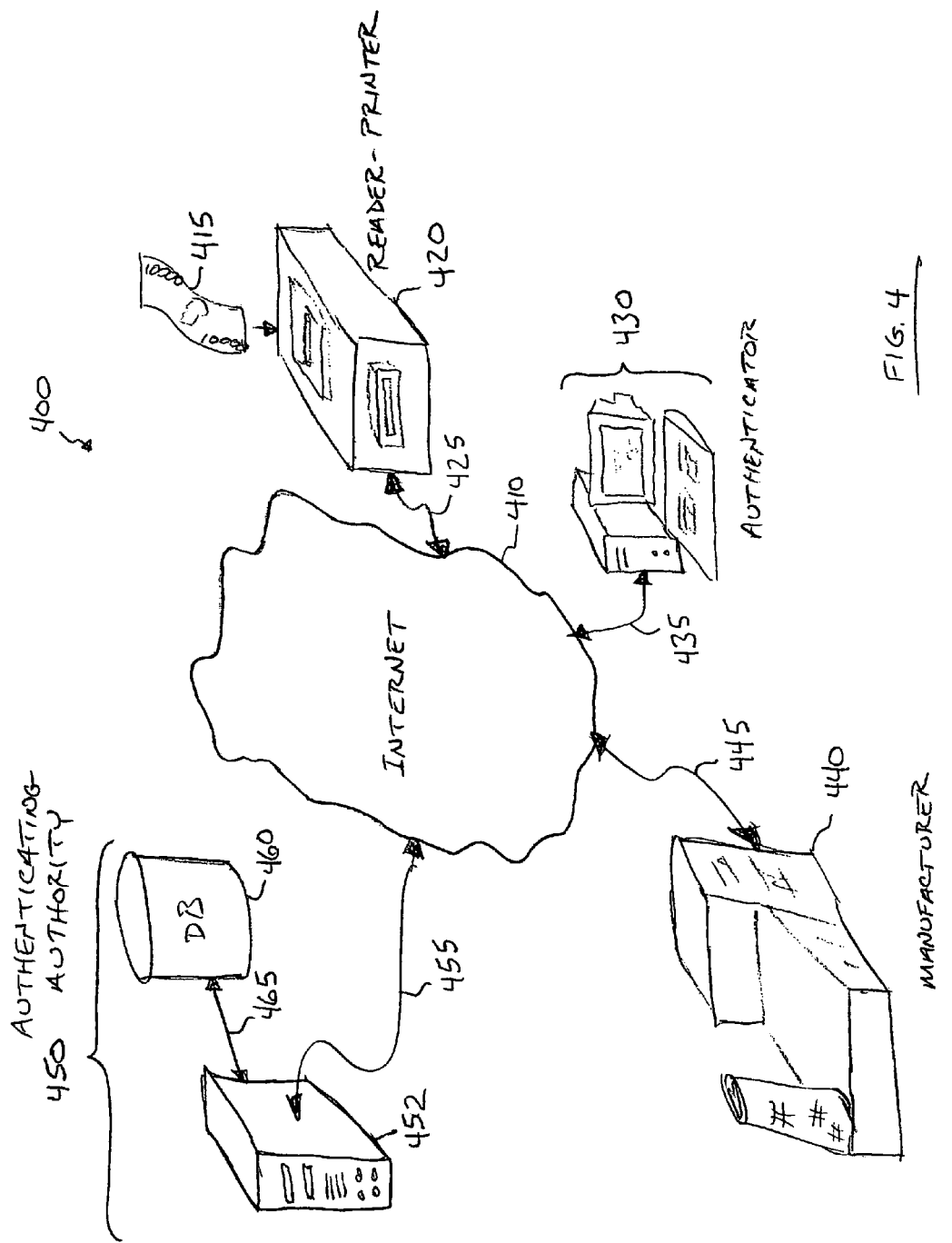
FIG. 4 illustrates a communication network pursuant to the present subject matter.

FIG. 4 illustrates an exemplary system 400 for authenticating a manufactured product. In the figure, network 410 provides wide area communication between components that may be geographically diverse. Network 410, in one example, includes the internet or other digital data communication network. Network 410, in various examples, includes a satellite communication network, a land radio communication network or a telephony communication network.

Network 410 is coupled to device 420, authenticator 430, manufacturer 440 and authenticating authority 450 by communication links 425, 435, 445 and 455, respectively. Communication links 425, 435, 445 and 455, in various examples, include wired or wireless couplings.

Device 420, in one example, includes a combination reader-printer module that is configured to read an authentication code appearing on the document 415, request authentication from authenticating authority 450 and print additional characters on the document. In one example, device 420 is configured to attempt to read the newly added characters in order to verify subsequent readability. Device 420, in various examples, is configured to authenticate currency, a document or a label affixed to a product manufactured by manufacturer 440. In one example, device 420 is configured to operate in a stand-alone mode in which a document is scanned and authenticated without interaction from a human operator. In one example, device 420 is coupled to authenticator 430 by a communication link, and in the embodiment illustrated, includes a wide area network. The communication link between device 420 and authenticator 430, in one example, includes a local area network or other data communication channel.

Device 420, in the example illustrated, includes a document transport mechanism that reads characters or data using an optical or magnetic reader. Other readers are contemplated, including a handheld or stationary wand device, a bar code reader and a radio frequency identification (RF-ID) reader.

Authenticator 430, in the example illustrated, includes a processor coupled to a display and a keyboard. The display presents prompts, instructions and other data for authenticating a product, document or currency. The keyboard receives user input and instructions for authenticating and the processor executes instructions to communicate with other elements of the system, including authenticating authority 450 and a human operator. Authenticator 430, like device 420, is disposed in a user-accessible location to facilitate authentication of documents, products and currency.

Manufacturer 440 is coupled to wide area network 410 and provides verified authentication data for use in the present subject matter. In various examples, manufacturer 440 includes a printer, a product manufacturer, a gemstone production facility or other source of relatively high-valued objects.

Authenticating authority 450 is coupled to wide area network 410 and includes a processor 452 coupled to database 460 by link 465. Processor 452, in various examples includes a server or a computer executing instructions for authenticating products, documents and currency according to the present subject matter. Processor 452 includes instructions and memory. Database 460 includes verified information received from manufacturer 440 and party-specific data corresponding to authenticated products. Link 465, in various examples, includes a wired or wireless data communication channel.

Document or Currency Authentication Codes

Existing security methods and devices for documents and currency include serial numbers, plate numbers, seals, signatures, engraved pictures, water marks, identification strips, specialized inks, specialized papers, color shifting inks, microprint, fluorescent UV markings and IR markings. The multiplicity of such methods employed speaks to the inadequacy of any single method by itself. Further, even when a number of such methods are used simultaneously, as in government issued currency, still criminal organizations or rouge governments with the resources to duplicate the methods being used are able to defeat them and produce high quality counterfeits at will. Finally, each security method added to a document or currency increases the cost of producing that document or currency. An advantage of the present method is that it can replace the existing methods and result in a reduced cost of producing documents and currencies.

Various embodiments of the present subject matter can serve to deter and detect counterfeiters, increase confidence in the authenticity of documents and currencies and frustrate attacks on them by providing a readily practicable authentication method. In one example, the present subject matter authenticates a currency or document based on a pre-existing mark and then goes on to modify that mark or apply an additional mark (or authentication code) to the currency or document to facilitate subsequent authentication. In one example, the present subject matter includes both authentication of an article and application of an additional authentication code.

Initial authentication includes, for example, comparing a pre-existing or first authentication code with a list of known authentic codes. In one example, the authentication code includes a serial number. Application of an additional mark includes, for example, printing or marking the article with a second authentication code. The second authentication code is marked in a manner that is durable and subsequently identifiable. The first and second authentication codes can be random, or pseudorandom, and applied in a random or pseudorandom manner. The first and second authentication codes can include the identity of the authenticating authority and date of authentication.

The nature and position of the first and second authentication code is communicated to an authenticating authority for maintenance in a database. In one example, the article is authenticated in a subsequent request for authentication provided that both the first and the second authentication codes are present. In one example, a third authentication code is generated and marked on the product wherein the third authentication code is generated as a function of the first and second authentication code. In one example, the first or second authentication code is no longer determinative as to the authenticity of the article.

It may be instructive here to consider an example in which a currency is printed with a first authentication code. A counterfeiter may successfully replicate the currency with the first authentication code and that counterfeit currency will likely then be improperly authenticated and accepted at the first instance of authentication. Also, however, at that first instance of authentication, a second authentication code is added to the counterfeit currency and that second authentication code is stored with the authenticating authority. At this point then, the original and genuine currency is no longer able to be authenticated because it does not have the additional or changed marking (the second authentication code) that occurred in the authentication event for the counterfeit. As a practical matter, in this example the counterfeit has replaced the original, but at no profit to the forger since the original is now unable to be authenticated. In this way, the present method deters counterfeiting by making it unprofitable.

In addition, an authenticating authority, in this example, may be instructed to seize any currency incapable of authentication. Thus, should the counterfeiter in the above example attempt to pass the original currency, it would not be accepted, and there would likely be an investigation. As should be clear from this example, it is a further advantage of the present method that the authenticating authority can be instructed then to deny authentication to a bill even when it has all the necessary authentication codes in perfect order. In this case, whether the counterfeit or the original is first passed and authenticated, both bills may be identified, seized, and returned to the proper authorities in a timely manner for further investigation. In this way, counterfeiters and those who might seek to profit by passing counterfeit bills will be further deterred. In one example, the authenticating authority includes a financial institution such as a bank.

As an additional security feature, to defeat any attempt to determine a pattern in the application of or modification of currency authentication codes by the authenticator, the authenticating authority may also require that the authenticator, once a currency is authenticated, not return the exact currency, but only one similarly authenticated, to the bearer.

In one example, an authenticating authority can monitor or track movement of currency based on authentication codes. In one example, an authenticating authority can impose geographical or temporal restraints on currency.

Multiple authenticating authorities are contemplated in the present subject matter both for the convenience of access by authenticators and parties and to insure the safety and reliability of the authentication system by redundancy. The use of multiple authenticating authorities requires their ability to communicate in a timely manner any changes in party-specific codes or document or currency authentication codes. Their methods of communication may include radio frequency or satellite communication, communication over the Internet or by telephony, or by means of a direct optical or electrical communication link. An individual authenticating authority may poll other authenticating authorities.

The following are exemplary applications of the present subject matter.

EXAMPLE I

Authentication of a Wristwatch

The manufacturer of a wristwatch chooses from a number of possible authentication codes available to itself and its production and causes one specific code to be inscribed on the product. The authentication code chosen for a particular wristwatch is Breitling1884-E65362. The manufacturer communicates the authentication code to an authenticating authority which may be under contract to the manufacturer. The authenticating authority communicates with parties desiring to authenticate products through the Internet.

The purchaser of the wristwatch, though he is dealing with a reputable dealer, nonetheless authenticates the watch. To do so, he accesses the Internet and navigates to the website designated as the authenticator for this brand of watch. He enters the product authentication code Breitling1884-E65362 and the purchaser's party-specific code. The purchaser's party specific-code is maintained in secrecy and, in this example, the purchaser selects a combination of the date of purchase and a nickname. Assume that the purchaser's party-specific code is 8/9/2008schatz.

The authenticating authority compares the product authentication code received via the Internet with a list of codes previously received from the manufacturer. Assume that the product authentication code matches a code appearing on the list of codes received from the manufacturer. In this case, there is no party-specific code associated with this particular authentication code, and thus, the authenticating authority establishes a connection. As such, the authenticating authority generates an association between the party-specific code and the authentication code. The authenticating authority generates and conveys a message to the purchaser that the authentication code matches a code provided by the manufacturer and thus, with a relatively high degree of certainty, the product is authentic.

In one example, the authenticating authority generates and provides a second authentication code, which, in this example, is W821-Z7B9-QQV8. The second authentication code is provided at the behest of the manufacturer, for example, in the interest of maintaining a relationship with the purchaser.

The purchase can use the second authentication code to register their purchase and the manufacturer can offer an incentive. In this example, the incentive is an offer for a free certificate redeemable for maintenance service of the wristwatch. Continuing with the example, the purchaser elects to decline the offer extended by the authenticating authority to navigate the purchaser's browser directly to the manufacturer's Internet website. Instead, the purchase prints the second authentication code with intentions to return at a later date to complete the product registration process.

At some time in the future, a thief enters the purchaser's residence and is dissuaded from stealing the wristwatch knowing that products from this particular watch manufacturer are authenticated. Because the watch is probably authenticated, so goes the reasoning of the thief, the watch is left behind.

At yet another time in the future, the purchaser sells the watch to a subsequent buyer. The buyer is willing to pay a good price provided the watch can be authenticated. The buyer uses the Internet to navigate to the authenticating authority for this particular watch manufacturer. When prompted, the buyer enters the first product authentication code Breitling1884-E65362 read from the back of the watch. The purchaser then enters his party-specific code of 8/9/2008schatz. The authenticating authority returns the information that a match was made, and queries the purchaser to determine whether the authenticated product is to be transferred to another party. The purchaser responds in the affirmative and the buyer then takes over the terminal and, unseen by the purchaser, the buyer enters his own party-specific code, which, in this case, is a combination of his business name and date of birth GreenMink3/22/1985. The authenticating authority accepts the buyer's party-specific code and notifies the parties that the authenticated product has been transferred.

The authenticating authority maintains a database to facilitate traceability of the product. Following the foregoing example, the database of the authenticating authority has the following structure:

PAC: Breitling1884-E65362
Prior P-SC: 8/92008schatz
Current P-SC: GreenMink3/22/1985

Continuing with the example, consider that the buyer and the purchaser (seller) later choose to independently verify the authentication just completed. The purchaser returns to the Internet website of the authenticating authority and enters the product authentication code Breitling1884-E65362 as well as his own party-specific code 3/9/2008schatz. The authenticating authority, in this case recognizes the product authentication code but the entered party-specific code is no longer associated with the product authentication code and thus, no match is reported. The information is returned to the purchaser.

Consider the buyer who opts to verify the product authentication just completed. The computer used by the buyer has captured the purchaser's party-specific code. The purchaser (seller) may use different codes for other authenticated items. The buyer enters the product authentication code and the purchaser's party-specific code at the authenticating authority website and receives the same information as received by the purchaser that no match could be made. The buyer then re-enters the product authentication code along with his own party-specific code GreenMink3/22/1985, and is notified that a match was made and, therefore, the product is very probably authentic.

The authenticating authority then prompts the buyer as to whether he would like to transfer the authenticated product to another party. In this case, the buyer declines and the process ends.

EXAMPLE II

Authentication of a Document

A government agency having many employees and requiring a high degree of security issues to its employees a modifiable form of identification card. On one side of the card is the person's picture and other identifying information. The opposite side of the card includes an optically addressable storage surface that allows reading and writing of data. The stored data is scanned by one or more lasers in a linear manner. Data encoded on this surface includes the information appearing on the front of the card in addition to other pertinent data and a document authentication code. A portion of the storage surface is available to receive additional data.

As the employee moves through a security check point, a card reader reads the document authentication code stored on the card and communicates this code to an authenticating authority. The authenticating authority compares the stored authentication code received from the employee's card with a code assigned to this particular employee by the agency issuing the identification card. A notification message is generated to security personnel if there is a discrepancy and, in one example, an alarm is sounded. If there is a match, then the card reader writes additional data to the storage surface of the card. The data written to the surface of the card, in various examples, includes an additional code or a modified version of the authentication code. The data written to the surface of the card is reported to the authenticating authority. Having detected a match between the code assigned to the particular employee and the authentication code, the particular employee is granted access to the facility.

Specifically, John Wesley Harding is an employee of the Treasury Department. His employee ID number is: 02217943. It is his first day at work and the first time he will be subjected to a security check, including identification document authentication. His employee identification authentication code is: k29VS-ZIi0W-QVXcn-92Bx3-18UW9-dPP47-TymmL. This is optically encoded on the reverse side of his card.

At the Treasury Department's security checkpoint, he inserts his identification card into the security check point card authenticator reader/writer and the authentication code is read by the optical card reader. The code is transmitted to the authenticating authority that is a computer located on the forth floor of the building. Upon comparison of this code received to the authentication code that had been stored there by the Treasury Department's issuer of identification documents, there is a match.

Upon determination of the match, the authenticating authority instructs the authenticator card reader to add the code: 2nW49-pMW18 to the existing code on the card. The authenticator does this, rereads the card to verify the addition, and communicates the successful writing back to the authenticating authority. The authenticator then illuminates a green light to indicate authentication has been successful and returns the ID card to the new employee. The authenticating authority now modifies its authentication code for this employee to be: k29VS-ZIi0W-QVXcn-92Bx3-18UW9-dPP47-TymmL-2nW49-pMW18.

In the above example, the identification card for the particular employee is changed by the addition of new data whenever the card is presented to the reader. Since the forgery of an identification card would likely require several days, any intervening use of the authentic identification would cause the document authentication code to have changed, rendering the forged document immediately identifiable. Even if a forged identification could be used before the original was again used, the use of the original would immediately alert the security personnel to the existence of a forgery and an investigation would likely ensue.

EXAMPLE III

Authentication of a Currency

A purchaser offers cash, in the form of twelve $100 bills to a retail clerk for the purchase of goods in the amount of $1,152. The store verifies the currency tendered by means of the present subject matter.

As such, the bills are run through a currency reader/imprinter device which scans or reads the unique authentication code marked on each bill. The device then communicates on a secure channel, with an authenticating authority. In this example, the authenticating authority is a local bank. The authenticating authority compares the authentication codes from the scanned currency with those maintained by the authenticating authority. Assume, in this case, that each bill is authenticated by finding a match. In one example, the authenticating authority transmits, to the device, a new microprint code for each bill. In one example, the device then prints the unique microprint code on each individual bill. In one example, and for each bill, the device executes instructions to generate a unique code that is added to the bill and communicates the unique code to the authenticating authority. The newly added unique code becomes part of the authentication code for each bill.

The device adds the microprint in a predetermined location on the bill. In one example, the predetermined location is verified by re-reading the bill. The device retains the bills as they are scanned and prompts the clerk to tender the appropriate change for the transaction.

EXAMPLE IV

Invalidation of Currency

A bank in suburban Los Angeles, Calif., as a normal course of business, authenticates its currency according to the methods of the present subject matter. On a particular day, armed gunmen rob the bank of the currency received from depositors.

The gunmen escape the building with genuine currency. Upon the receipt of the burglar alarm, and just moments after the gunman have fled, the bank's computer system determines what bills it still possesses and what ones have been taken. It determines that 1,253 bills were stolen and collects a list of the currency authentication codes associated with each of those bills. The bank's computer then contacts the authenticating authority, the US Federal Reserve Bank of San Francisco, and indicates that it has been robbed. The bank's computer provides the authenticating authority with a listing of the currency authentication codes of the bills stolen.

The authenticating authority then flags the currency authentication codes of those 1,253 bills with a "do not authenticate—stolen" designation. This process is completed within five minutes of the gunmen leaving the building.

The gunmen, unaware that the stolen currency cannot now be authenticated, travel to Las Vegas, Nev. with intentions to pass the bills. When presented for authentication at a casino, the stolen currency is identified and the gunmen are apprehended.

Additional Examples

One example of the present subject matter includes a device having a user-operable data code entry port. The entry port, in various examples, includes a keyboard, a mouse, a touch sensitive screen or a removable media data storage device reader such as a disk drive or jump drive. In addition, the present subject matter includes a code receiver configured to receive an authentication code from a tangible object. The code receiver, in various examples, includes a magnetic data reader, an optical data reader or a keyboard. Furthermore, the present subject matter includes a memory coupled to the receiver and a processor. The memory is configured to store the authentication code and the data code and the processor executes instructions to classify a combination of the authentication code and the data code based on a comparison of the authentication code, the data code and a database. The database includes verified authentication data received, for example, from a manufacturer.

In one example, the processor is coupled to an output port that renders a signal based on the classification. The output port, in various examples, includes a visual display, an audio transducer or speaker, a wireless transmitter and a network interface for coupling with a local or wide area data network. In one example, a printer is coupled to the processor and the printer executes instructions to generate a mark on the object. The processor and memory, in one example, are coupled by a communication or data network.

In one example, the present subject matter includes a system having a data receiver, a communication network, a database and a processor. The receiver is configured to receive an authentication code from an object and an identity code from a user. The communication network is coupled to the data receiver and is configured to communicate data based on the authentication code and the identity code. In one example, the communication network includes the internet. The database is coupled to the communication network and includes verified data received, for example, from a manufacturer. The verified data includes a plurality of authentication codes representing genuine products, documents or currency. A processor is coupled to the communication network and classifies authenticity based on the stored data in the database, the authentication code and the identity code. An output device is communicatively coupled to the processor and renders a notification based on the classification. In one example, the data receiver applies a mark to the object.

One example of the present subject matter is embodied in a method that includes accessing an object, associating an authentication code with the object and storing the authentication code in a memory. The memory is coupled to a processor that correlates a party-specific code with the authentication code in response to an authentication query. The party-specific code is received with the authentication query. Accessing the object includes, for example, manufacturing or acquiring. Associating the authentication code with the object includes, in various examples, printing, etching, embedding, engraving, encoding and storing in a storage register or memory of the object. In particular, an authentication code can be marked on a chemical storage container, a pharmaceutical product container, a medical device, a biological sample container, a mechanical component, an electronic component, an appliance, a gemstone, a fine art specimen, furniture, apparel, a shipping container, a box or an envelope. The authentication code, in one example, includes at least one character that is hidden from view. For example, a hidden character can be concealed or obscured by a seal, a wrapper or a closure. In one example, storing the authentication code includes communicating the code to a processor using a wide area network. The internet is one such example of a wide area network and other networks suitable for use with digital data are also contemplated.

One example of the present subject matter is embodied in a method that includes receiving an authentication code associated with an object, receiving a user entered identity code at a processor, executing an instruction set on the processor to classify authenticity of the object as a function of the authentication code, the identity code and a stored code and signaling an outcome based on the classifying. The stored code is received from a verified supplier such as a manufacturer. In one example, the method includes adding a secondary code to the object and confirming addition of the secondary code. In one example, the secondary code is stored in a memory coupled to the processor. In one example, receiving the authentication code includes reading the authentication code. Reading can include, in various examples, optically detecting, magnetically detecting, wirelessly detecting and tactilely detecting. In one example, receiving the authentication code includes receiving digital data transmitted using a wide area network.

CONCLUSION

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the present subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed:

1. A method comprising:
receiving by a computer processor an authentication code associated with an object and a party-specific code associated with a party, the party-specific code is unknown to the processor prior to its receipt by the processor;
subsequently executing an instruction set by the processor to classify authenticity of the object as a function of the authentication code and a stored code to which no party-specific code is associated, the stored code received from a manufacturer of the object;
subsequently causing the party-specific code to become associated with the stored code upon matching of the authentication code to a stored code such that the stored code is judged to no longer match the authentication code;
subsequently signaling an outcome based on the classifying;
prompting the party for a selection as to whether the party would like to transfer the object to another party if the outcome indicates that the object is authentic and it is determined that the object is intended and allowed by the manufacturer to be transferred between parties; and causing a new party-specific code received from the another party to become associated with the stored code after a response to the prompt indicates the authentic object is being transferred to the another party.

2. A method comprising:

receiving by a computer processor an authentication code associated with an object and a party-specific code associated with a party, the party-specific code is unknown to the processor prior to its receipt by the processor;

subsequently executing an instruction set by the processor to classify authenticity of the object as a function of the authentication code and a stored code to which no party-specific code is associated, the stored code received from a manufacturer of the object;

subsequently causing the party-specific code to become connected to or combined with the stored code upon matching of the authentication code to a stored code such that the stored code is judged to no longer match the authentication code;

subsequently signaling an outcome based on the classifying;

prompting the party for a selection as to whether the party would like to transfer the object to another party if the outcome indicates that the object is authentic and it is determined that the object is intended and allowed by the manufacturer to be transferred between parties; and causing a new party-specific code received from the another party to become associated with the stored code after a response to the prompt indicates the authentic object is being transferred to the another party.

3. A method comprising:

receiving by a computer processor an object's authentication code and a party-specific code associated with a party, the party-specific code is unknown to the processor prior to its receipt by the processor;

subsequently executing an instruction set by the processor to classify authenticity of the object as a function of the object's authentication code and a stored code to which no party-specific code is associated, the stored code received from a manufacturer of the object;

subsequently causing the party-specific code to become connected to or combined with the stored code upon matching of the authentication code to the stored code such that the stored code is judged to no longer match the authentication code;

subsequently signaling an outcome based on the classifying;

prompting the party for a selection as to whether the party would like to transfer the object to another party if the outcome indicates that the object is authentic and it is determined that the object is intended and allowed by the manufacturer to be transferred between parties; and causing a new party-specific code received from the another party to become associated with the stored code after a response to the prompt indicates the authentic object is being transferred to the another party.

\* \* \* \* \*